United States Patent [19]

Pittore et al.

[11] Patent Number: 4,946,198
[45] Date of Patent: Aug. 7, 1990

[54] CHILD SAFETY STRAP

[76] Inventors: Joseph P. Pittore, 803 Sandwedge Ct., Warrington, Pa. 18976; Bruce J. Waldron, 15 Buckmanville Rd., Newtown, Pa. 18940

[21] Appl. No.: 294,800

[22] Filed: Jan. 9, 1989

[51] Int. Cl.⁵ ............................................. B60R 22/00
[52] U.S. Cl. ..................................... 280/808; 297/482
[58] Field of Search ................ 280/808; 297/482, 483, 297/486

[56] References Cited

U.S. PATENT DOCUMENTS 4,832,367  5/1989  Lisenby ................................ 280/808

FOREIGN PATENT DOCUMENTS 489040  11/1976  Australia ............................... 297/483
3132735  3/1983  Fed. Rep. of Germany ...... 297/483
53268  3/1987  Japan .................................. 297/483

Primary Examiner—Kenneth R. Rice
Attorney, Agent, or Firm—Steven J. Rocci

[57] ABSTRACT

A child safety strap adapts a safety belt of the type comprising a standard lap belt and shoulder belt for use by small children. The child safety strap reduces the angle between the lap belt and shoulder belt so that the shoulder belt crosses the child's chest.

6 Claims, 2 Drawing Sheets

CHILD SAFETY STRAP

BACKGROUND OF THE INVENTION

The present invention relates generally to the field of seat belts used in motor vehicles. More particularly, the present invention relates to an improvement in such seat belts so that the shoulder harness portion can effectively and safely be used to strap a small child into the vehicle seat.

Seat belts provide the occupants of a motor vehicle with a means of reducing the risk of severe injury in the event of an accident. A typical seat belt is comprised of a lap belt which fits across the user's lap and a shoulder belt which fits across a user's upper torso at an angle relative to the lap belt such that it contacts the user's body on one side at or about the shoulder level, and on the other side at or about the lower abdomen or lap. The seat belt is useful for its intended purpose so long as the user is large enough so that the shoulder belt does not cross his or her body at a point above the shoulder, i.e., the angle between the lap and shoulder belts must be small enough so that the shoulder belt crosses the body below the user's head. The shoulder belt should not cross the user's neck or face as this could be dangerous.

The present invention addresses the need for a device to adapt existing seat belts for use by small children who are, because of their size, generally relegated to the rear seat and/or confined to a specially made "child's seat". The present invention allows small children to use standard seats and seat belts.

SUMMARY OF THE INVENTION

According to the present invention, a "child safety strap" adapts a conventional seat belt for use by a small child by reducing the angle between the lap and shoulder belts. The angle is adjustable to suit the size of the child. The device is comprised of (1) an adjustable strap, referred to herein as a "child safety strap"; (2) a first set of two clips which attach to the existing lap and shoulder belts; (3) a second set of two clips for attaching the child safety strap to the first set of clips; and, (4) "buttons" to prevent the child safety strap from becoming detached from the second set of clips.

DETAILED DESCRIPTION OF THE PREFERRED EMBODIMENT

Figure 1:
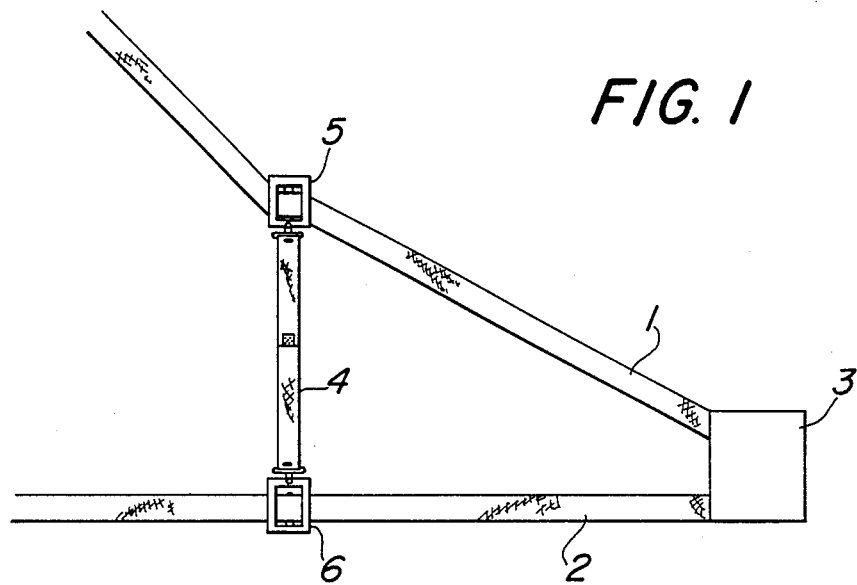
FIG. 1 is a plan view illustrating use of the present invention in conjunction with a conventional seat belt.

Referring now to drawings wherein like numerals represent like elements, there is illustrated in FIG. 1 a conventional seat belt consisting of a shoulder belt 1, a lap belt 2, and seat belt buckle 3. According to the invention, a child safety strap 4 is provided and is connected to two clips, 6 and 5, which in turn are attached to the lap and shoulder belts 2, 1 respectively. The "effective length" of the child safety strap 4 is adjustable so that the shoulder belt 1 can be pulled closer to the lap belt 2 in accordance with the needs of the user.

Figure 2:
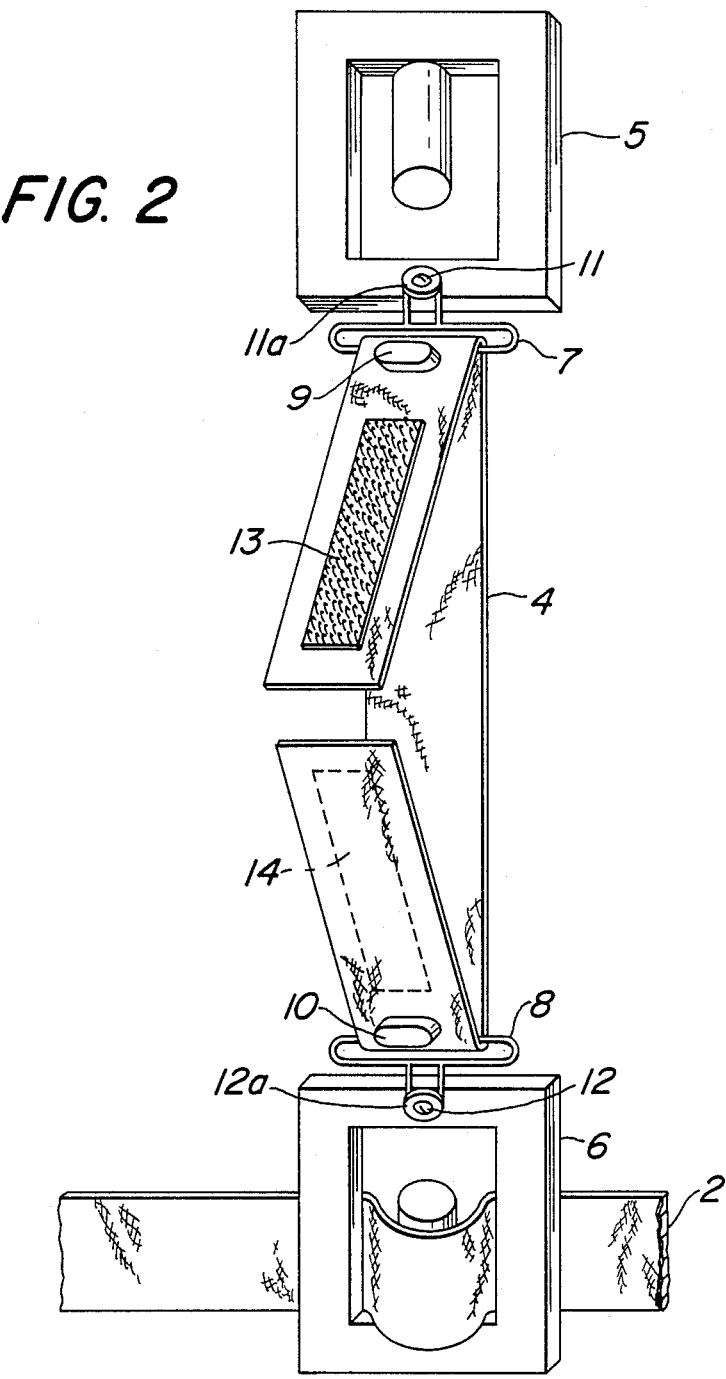
FIG. 2 is a perspective view illustrating details of a preferred embodiment of the present invention.

FIG. 2 illustrates the invention in greater detail. FIG. 2 illustrates a child safety strap 4 in combination with clips 6, 5 used to attach the strap to the lap and shoulder belts 2, 1. According to one embodiment of the invention, the child safety strap 4 is made of a length of conventional seat belt material having an effective length that is adjusted by forming the material into a loop, as shown in the FIG. 2, and joining the opposite ends thereof by means of hook and latch fasteners 13, 14, such as Velcro ® type. As shown, the hook and latch fasteners 13, 14 are secured to opposite ends of the strap 4 by any suitable means such as stitching, adhesive, etc. The first set of two clips, 5 and 6, attach to the shoulder and lap 1, 2 belts respectively, as indicated in the lower portion of FIG. 2. The first set of clips 5, 6 is attached to the child safety strap 4 by means of a second set of clips, 7 and 8, which attach to the first set of clips 5, 6 by way of a pair of screws, 11 and 12, which allow the second set of clips 7, 8 to pivot about connection points 11a, 12a relative to the first set of clips 5, 6. When the child safety strap 4 is not formed into a loop, i.e., when it is not in use, it is prevented from becoming detached from the second set of clips 7, 8 by means of a pair of buttons, 9 and 10, sewn onto the strap 4 to act as an obstruction stopping the strap 4 from sliding out of the second set of clips 7, 8 so that the entire embodiment remains assembled.

The present invention may be embodied in other specific forms without departing from the spirit or essential attributes thereof, and accordingly reference should be made to the appended claims rather than to the foregoing specifications as indicating the scope of the invention.

We claim:

1. In a safety belt having a lap belt and a shoulder belt with an angle therebetween when in use, an apparatus for adjusting the angle comprising:
   (a) a safety strap;
   (b) means for,
      (i) attaching one end of the safety strap to the lap belt, and,
      (ii) attaching the other end of the safety strap to the shoulder belt, said means for attaching the safety strap to the lap and shoulder belts comprising a first set of two clips to which the lap belt and shoulder belt are attached, a second set of two clips to which the safety strap is attached, and means for attaching the first set of clips to the second set of clips, said means for attaching the first set of clips to the second set of clips comprising pivot means for enabling the second set of clips to freely pivot about a point of attachment relative to the first set of clips.

2. Apparatus of claim 1 wherein the safety strap has an effective length that is adjustable.

3. Apparatus of claim 1 further comprising means for preventing the safety strap from slipping out of the second set of clips.

4. Apparatus of claim 2 where the safety strap comprises:
   (a) a length of material having two ends; and
   (b) means for attaching the two ends of the strap to form a closed loop.

5. Apparatus of claim 3 wherein the means for preventing the safety strap from slipping out of the second set of clips comprises a set of buttons.

6. In a safety belt having a lap belt and a shoulder belt with an angle therebetween when in use, an apparatus for adjusting the angle comprising:
   (a) a safety strap; and,
   (b) means for, (i) attaching one end of the safety strap to the lap belt, and (ii) attaching the other end of the safety strap to the shoulder belt, the means for attaching the safety strap to the lap and shoulder belts comprising a first set of two clips to which the lap belt and shoulder belt are attached, a second set of two clips to which the safety strap is attached, and means for attaching the first set of clips to the second set of clips, the means for attaching the first set of clips to the second set of clips comprising pivot means for enabling the second set of clips to freely pivot about a point of attachment relative to the first set of clips, the apparatus further comprising means for preventing the safety strap from slipping out of the second set of clips, the means for preventing the safety strap from slipping out of the second set of clips comprising a set of buttons.

* * * * *